3,699,067
ACRYLIC TERPOLYMER RESINS PLASTICIZED WITH SILICONE OILS

Charles H. Stockman, Middlesex County, Mass., assignor to The B. F. Goodrich Company, New York, N.Y.
No Drawing. Filed Sept. 4, 1970, Ser. No. 69,989
Int. Cl. C08f *45/50;* B44d *1/09*
U.S. Cl. 260—29.1 SB     1 Claim

ABSTRACT OF THE DISCLOSURE

Film forming acrylic resin terpolymers are found to be plasticized by the addition of silicone oils. Flexibility of the films and improvement thereof against cracking and blocking is achieved.

BACKGROUND OF THE INVENTION

Terpolymer resins comprising mixtures of lower acrylic acid ester, methacrylic acid ester and alpha-beta olefinically unsaturated carboxylic acid are known. These resins are insoluble in neutral and acid water and soluble in alcohols, acetone, pyridine and alkaline water.

When applied to a substrate by any known technique including dipping, spreading, spraying, knife coating, draw bar coating and the like from solutions, these terpolymer resins form dry films on the substrate which are resistant to abrasion, weathering and some types of solvents including mineral acids, acid pH water, and hydrocarbons. The films are insoluble in neutral or acid water systems, but are soluble in alkaline water systems. One unique application of these resin-film systems is to form a "living glove" on the hands. The hand is dipped into an alcoholic solution of the terpolymer resin, withdrawn and dried in air. A thin glove, thickness 1 to 5 mils, is formed on the hand and is in close contact with the hand just as a rubber glove of the prior art would be. The glove conforms exactly to the hand and protects the hand against normal abrasion, against dirt and dust, against germs and bacteria. Such a glove is an ideal surgeon's and physician's glove as well as a glove for general uses where rubber gloves are employed. It is quickly applied to the hand, protects the hand in normal use and is removable and disposable merely by washing the hand in alkaline water. Other uses of the said films are to protect metal objects from inter object contact in handling which may result in damage or breaking and from rust or corrosion in moist, humid atmospheres. The films are completely removable in a very short time by treatment with an alkaline wash, a simple one being soapy water. In addition to removing and disposing of the protective film the wash cleans the object and leaves it in a fresh, shiny, eye appealing state.

Films applied to the hands and to many articles which inherently bend or flex, must also bend or flex to preserve film integrity. Films of the type described above have served their purpose well except for a shortness of flex life. One skilled in the art who is faced with a problem of this type, thinks of plasticizing the film to make it softer, perhaps more ductile, and, certainly, more flex resistant. Plasticizers for resins are known in the art. Vinyl resins have long been plasticized for improving processing and improved flex with organic phosphates, sebacates, phthalates and the like. These plasticizers of the prior art do not serve the purpose desired when they are incorporated in the acrylic terpolymer resins used for film forming purposes and described above. The known plasticizers are incompatible with these acrylic resins.

Another application of these resins is to form films on metal substrates, sheets, slabs, coils or formed shapes to protect the metals from weather during shipment or storage under moist conditions that ordinarily induce rust formations. In this use a shortcoming of the terpolymer acrylic film has been a tendency to block, that is to stick to itself or to another surface under conditions of high heat, pressure and humidity.

The discovery of this invention is that certain silicone oils are compatible with the acrylic terpolymer resins and give the desired flex life and softness to films deposited therefrom, as well as improved resistance to blocking when the films are applied to metal substrates.

SUMMARY OF THE INVENTION

Water soluble polymeric film-forming resins employed to form temporary protective coatings on metals and flesh are compositions comprising in 100 parts by weight of resin from 44 to 96 parts by weight of a lower acrylic acid ester, from 1 to 44 parts by weight of a methacrylic acid ester and from 3 to 12 parts by weight of an alpha-beta olefinically unsaturated carboxylic acid having a terminal $CH_2=C<$ group and having from 3 to 4 carbon atoms. They can be represented by the formula:

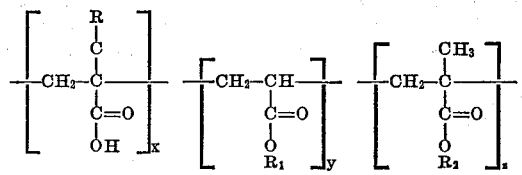

wherein R represents hydrogen and methyl, $R_1$ represents an alkyl radical having 1 to 10 carbon atoms such as methyl, ethyl, propyl and decyl, $R_2$ represents methyl and ethyl, $x$ represents from 3 to 12 weight percent based on the combined weight of $x$, $y$ and $z$; $y$ represents from 44 to 96 weight percent based on the combined weight of $x$, $y$ and $z$; $z$ represents from 1 to 44 weight percent based on the combined weights of $x$, $y$ and $z$; the sum of numerical values of $x$ plus $y$ plus $z$ is always 100 and the groups $x$, $y$ and $z$ are present in the polymer in a heterogeneous relative order.

The lower acrylic acid esters useful in the resins used in this invention include those in which $R_1$ in the above formula is an aliphatic hydrocarbon group having from 1 to 10 carbon atoms such as methyl acrylate, ethyl acrylate, n-propyl acrylate, isopropyl acrylate, 2-ethylhexyl acrylate, n-butylate, isobutyl acrylate and secondary butyl acrylate. The most preferred lower acrylic acid esters are methyl acrylate and ethyl acrylate.

The lower methacrylic acid esters useful in this invention include those in which $R_2$ in the above formula is an aliphatic hydrocarbon group having from 1 to 2 carbon atoms such as methyl methacrylate and ethyl methacrylate. The preferred methacrylic acid ester is methyl methacrylate.

The alpha-beta olefinically unsaturated carboxylic acids embodied in this invention include acrylic acid and methacrylic acid.

The alkaline water-soluble thermoplastic terpolymers used in this invention are prepared by well-known polymerization techniques, e.g., bulk, solvent, and emulsion polymerization. Terpolymers of lower alkyl acrylates, lower alkyl methacrylates and acrylic or methacrylic acids are shown and described in U.S. Pats. 2,760,886, 2,790,735, 2,934,509, 3,454,509 and 3,460,945 among others. In especially useful embodiments, the polymers are prepared in solution polymerization. Monomers are dissolved in a reaction solvent, along with a peroxide catalyst. When the catalyst is dissolved, the reaction solution is preferably metered over a period of time into a reaction vessel equipped for reflux. Terpolymers are obtained as solutions, generally of of about 60% total solids.

The acrylic resins prepared by the polymerization of these materials are insoluble in neutral or slightly acid (pH 6.0–7.0) water, soluble in alkaline water, and soluble in methanol, ethanol, isopropanol, acetone, alkyl acetates and pyridine. They form thermoplastic, water insoluble films when spread on substrate, and have a glass transition temperature above about 20° C.

The polymerization of these monomers is catalyzed by a free radical generating catalyst such as a peroxide or hydroperoxide. Hydrogen peroxide, benzoyl peroxide, caproic peroxide, tertiary butyl peroxide, caprylyl peroxide and cumene hydroperoxide are typical useful catalysts.

Solution polymerization may be run in refluxing solvent such as ethylene glycol monoethyl ether, ethanol, benzene or toluene. The reactor is preferably purged with nitrogen to remove any traces of air or oxygen. Polymerization is conducted at the refluxing temperature of the solvent used. When the reaction is complete the product resin is dissolved in the solvent with a solids content of about 50%–65%.

Similar terpolymers in water solution may be prepared by emulsion polymerization methods. Monomers are dispersed at room temperature in an aqueous solution comprising an emulsifying agent such as sodium lauryl sulfate and adding a redox catalyst. Product polymers are generally 30% to 45% total solids solution.

Alternatively solvent polymerized polymers may be converted to water solutions by azeotropic distillation techniques known in the art. When spread on the skin or other substrate and dried, either a water or hydrocarbon solvent solution of the terpolymer forms clear, glossy water-insoluble (unless the water is alkaline) films.

The silicone oils that have unexpectedly proved useful as plasticizers for these resins and the films formed therefrom have the general formula;

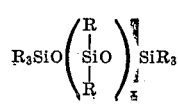

where R is a saturated or unsaturated aliphatic or cycloaliphatic hydrocarbon radical including methyl, ethyl, propyl, vinyl, allyl and cyclohexynyl, or a substituted or unsubstituted aryl radical such as phenyl, tolyl and the like, or a mixture of aliphatic, cycloaliphatic and aryl radicals. The ratio of R:Si is approximately 2 and $x$ is an integer from 1 to about 10,000.

Silicone oils may contain small amounts of trifunctional siloxanes ($RSiO_3$), if these are properly balanced by suitable amounts of monofunctional siloxanes ($R_3SiO$). The molecular weight of the oil ranges from moderately low to very high. In the formula above $x$ may range from 1 to 10,000. A suitable oil results when $x$ is 7 or greater. Lower limit for $x$ is determined by the volatility which is permissible in the application of the plasticized acrylic terpolymer film. A silicone oil where $x$ is 10,000 is still a liquid albeit viscous, material.

Preferably the silicone oil is added to the acrylic resin terpolymer in alcohol solution. The preferred range of silicone oil is 0.1 to 10% by weight, based on the weight of acrylic resin. The oil stirs smoothly into the resin in alcohol solution with agitation. Generally 0.015 to about 10 weight percent solutions of resin plus silicone plasticizer are employed for applying wet films to substrates to be coated. The solvent carrier evaporates and dry plasticized resin films of 1 to 5 mils thickness are left on the substrate. Thinner films are generally preferred because of economy. In the case of a film applied to the hand to form a "living glove," thin films are of prime importance to preserve the operator's sense of touch as in handling surgical instruments and body parts.

Silicone oils are available on the market from General Electric Company, Dow Corning, Inc. and others under the designations including SF 1700, SF 1702 and DC 556. These oils may be prepared by cohydrolysis of corresponding hydrolyzable silanes or by cocondensation of corresponding siloxanes.

DETAILED DESCRIPTION OF THE INVENTION

The following examples illustrate the invention. Parts are given as parts by weight.

Preparation of terpolymer acrylic resin

A dropping funnel is charged with 10 parts glacial acrylic acid, 60 parts ethyl acrylate, 30 parts of methyl methacrylate, 100 parts isopropyl alcohol and 4 parts benzoyl peroxide. When the peroxide is dissolved in the monomer solution, the contents of the funnel are metered over one hour into a one liter flask equipped with a reflux condenser, stirrer and heating mantle. Reaction temperature is maintained at 95°–100° C. during the metering period. The reaction is held at 105° C. for 5 hours and then cooled to yield a solution containing 60% by weight of terpolymer acrylic resin.

Solid resin is recovered by evaporating the isopropyl alcohol solvent. The resin is ground sufficiently to pass a 6 mesh (3.36 mm.) sieve screen. In this form it is readily soluble in alkaline water and the solvents mentioned above.

When a 15% solution of the resin is prepared in water and cast as a film on a clean steel test panel, the film is clear, continuous and glossy, tensile strength is 4000 p.s.i. and percent elongation is 165%.

EXAMPLE 1

The resin prepared as above is made up into a 25% solution in ethanol. Silicone is added at the rates of 1% and 10% on the resin and stirred to homogeneity.

Wet films 10 mils thick are cast on polyethylene film and dried. These are peeled off the substrate and tested for tensile and elongation.

Wet films one mil thick are cast on 4" x 6" 0.010" thick cold rolled steel rolled to lustre finish 5–15 microinches and on 304 stainless steel plates using a 2" Bird applicator. Blocking tests are conducted on 1" x 1" section of dry film using an Interchemical Block Tester (Koehler Instrument Co., Jamacia, N.Y.) with a 4–24 spring that produces a pressure range from 0 to 2000 p.s.i. at a controlled temperature.

Wet films are dried one minute at room temperature, then for two minutes at 200° F.

Coating adhesion to a substrate is rated visually by the resistance of the coating to removal by cellophane tape. Tape is pressed down firmly on the coated surface at room temperature; then pulled quickly at a 90° angle from the surface. The ratings applied are:

Excellent—no film removed
Good—less than 20% of film removal
Fair—30% to 50% of film removed
Poor—over 50% of film removed.

Flexibility is tested on the Gardner conical mandrel following ASTM D522-60 (reapproved 1968).

Alkali solubility is evaluated by allowing 5 drops of a 5% tri-sodium phosphate solution to remain on the film for 10 minutes. The film is soluble if completely removed after 10 minutes or less.

TABLE 1

| Sample | Control | A | B |
|---|---|---|---|
| Parts resin | 25 | 25 | 25. |
| Parts ethanol | 75 | 75 | 75. |
| Parts silicone | | 0.25 | 2.5. |
| On 304 stainless steel: | | | |
| Average dry film thickness (mils) | 0.28 | 0.35 | 0.29. |
| Adhesion | Excellent | Good | Fair. |
| Blocking: | | | |
| 150° F. at 2,000 p.s.i.—5 min | Severe | None | None. |
| 170° F. at 2,000 p.s.i.—5 min | do | do | Do. |
| 200° F. at 1,000 p.s.i.—5 min | do | Very slight | Very slight. |
| 200° F. at 2,000 p.s.i.—5 min | do | do | Do. |
| Flexibility | Pass | Pass | Pass. |
| Alkali soluble | Yes | Yes | Yes. |
| On cold rolled steel: | | | |
| Average dry film thickness (mils) | 0.28 | 0.31 | 0.33. |
| Adhesion | Excellent | Good | Good. |
| Blocking: | | | |
| 150° F. at 2,000 p.s.i.—5 min | Blocked | None | None. |
| 170° F. at 2,000 p.s.i.—5 min | do | do | Do. |
| 200° F. at 1,000 p.s.i.—5 min | do | do | Do. |
| 200° F. at 2,000 p.s.i.—5 min | do | Slight | Do. |
| Flexibility | Pass | Pass | Pass. |
| Alkali soluble | Yes | Yes | Yes. |

EXAMPLE 2

The acrylic resin terpolymer prepared as described above is made up as a 15% solution in ethanol.

To one portion an amount of Dow-Corning 556 silicone fluid equal to 0.5% on the resin is added. Two subjects dip their left hands in the solution up to the wrist. The film dries on the hand in air within 3 minutes. Faster drying is possible under a hair dryer type blower, or hot air blower such as is found in public wash rooms. The films are worn with no discomfort for two hours. There is no cracking, abrasion at the finger tips or film breakage even at the deep folds in the palm of the hand. Each subject's sense of touch with the coated hand equals that with the uncoated hand. The hands are washed with water (no soap) after ½ hour. No breaks are noticed in the films.

After two hours the hands are washed in soapy water and the films are thereby completely removed.

When the test is repeated using control resin solution with no plasticizing silicone present, the film dries to form a "living glove" in 3 minutes, but cracking develops at the folds on the backs of the fingers and in the palm of the hand.

I claim:

1. A composition comprising 99–90 parts by weight of an acrylic terpolymer film forming resin combined with 1 to 10 parts by weight of a plasticizing amount of silicone oil to form a total of 100 weight parts in combination wherein said acrylic terpolymer resin conforms to the formula

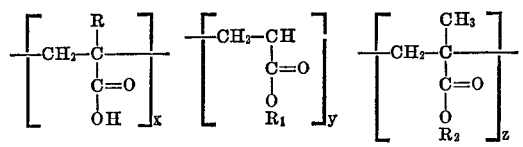

wherein R represents hydrogen and methyl, $R_1$ represents an alkyl radical having 1 to 10 carbon atoms such as methyl, ethyl, propyl, and decyl, $R_2$ represents methyl and ethyl, $x$ represents from 3 to 12 weight percent based on the combined weight of $x$, $y$, and $z$; $y$ represents from 44 to 96 weight percent based on the combined weight of $x$, $y$ and $z$; $z$ represents from 1 to 44 weight percent based on the combined weights of $x$, $y$ and $z$; the sum of the numerical values of $x$ plus $y$ plus $z$ is always 100 and the groups $x$, $y$, and $z$ are present in the polymer in a heterogeneous relative order and wherein said silicone oil has the formula $$R_3SiO\left(\begin{array}{c} R \\ | \\ SiO \\ | \\ R \end{array}\right)_x SiR_3$$

wherein R is selected from the group consisting of saturated and unsaturated aliphatic and cycloaliphatic hydrocarbon radicals, substituted and unsubstituted aryl radicals and mixtures of aliphatic, cycloaliphatic and aryl radicals, the ratio of R:Si is approximately 2 and $x$ is an integer from 1 to about 10,000

References Cited

UNITED STATES PATENTS

| | | | |
|---|---|---|---|
| 2,589,317 | 3/1952 | Young et al. | 260—29.1 SB |
| 2,645,624 | 7/1953 | Hunter | 260—29.1 SB |
| 2,752,638 | 7/1956 | Anspon | 260—29.1 SB |
| 2,934,509 | 4/1960 | Crissey et al. | 260—30.6 |
| 2,940,947 | 6/1960 | Welch et al. | 260—29.1 SB |
| 3,238,157 | 3/1966 | Smith | 260—29.1 SB |
| 3,332,900 | 7/1967 | Reischl et al. | 260—29.1 SB |

MORRIS LIEBMAN, Primary Examiner

S. L. FOX, Assistant Examiner

U.S. Cl. X.R.

117—161 UT